US007768422B2

(12) United States Patent
Carmen, Jr. et al.

(10) Patent No.: US 7,768,422 B2
(45) Date of Patent: *Aug. 3, 2010

(54) METHOD OF RESTORING A REMOTE WIRELESS CONTROL DEVICE TO A KNOWN STATE

(76) Inventors: Lawrence R. Carmen, Jr., 502 Bauer Rd., Bath, PA (US) 18014; Brian Michael Courtney, 1667 Marick Cir., Bethlehem, PA (US) 18015; Justin Mierta, 3129 Elm Dr., Allentown, PA (US) 18103; Benjamin A. Johnson, 250 Aubrey Dr., Quakertown, PA (US) 18951

( * ) Notice: Subject to any disclaimer, the term of this patent is extended or adjusted under 35 U.S.C. 154(b) by 852 days.

This patent is subject to a terminal disclaimer.

(21) Appl. No.: 11/470,424

(22) Filed: Sep. 6, 2006

(65) Prior Publication Data

US 2008/0068204 A1    Mar. 20, 2008

(51) Int. Cl.
  *G08C 19/30* (2006.01)
(52) U.S. Cl. .................... 340/825.72; 340/825.22; 340/2.2
(58) Field of Classification Search ........... 340/825.72, 340/825.22, 3.5, 3.51, 3.4, 3.41, 3.6, 2.2, 340/2.21, 2.24, 10.2
  See application file for complete search history.

(56) References Cited

U.S. PATENT DOCUMENTS

| 4,114,099 | A |   | 9/1978  | Hollander |
|-----------|---|---|---------|-----------|
| 4,529,980 | A |   | 7/1985  | Liotine et al. |
| 4,864,588 | A |   | 9/1989  | Simpson et al. |
| 4,932,037 | A |   | 6/1990  | Simpson et al. |
| 4,995,053 | A |   | 2/1991  | Simpson et al. |
| 5,239,205 | A |   | 8/1993  | Hoffman et al. |
| 5,340,954 | A |   | 8/1994  | Hoffman et al. |
| 5,365,551 | A |   | 11/1994 | Snodgrass et al. |
| 5,375,254 | A | * | 12/1994 | Owen .................. 455/525 |
| 5,454,077 | A |   | 9/1995  | Cheron |

(Continued)

FOREIGN PATENT DOCUMENTS

EP    0 767 551    4/1997

(Continued)

OTHER PUBLICATIONS

Z-Wave Alliance Day Technical Seminar Slides from www.z-wavealliance.com, Jun. 14, 2005, 32 sheets.

(Continued)

*Primary Examiner*—Daniel Wu
*Assistant Examiner*—Nay Tun

(57) ABSTRACT

The present invention provides a method of restoring a remotely-located control device of a wireless load control system to a default factory setting. The control device is operable to be coupled to a source of power and has a memory for storing programming information. First, a beacon message is transmitted repeatedly on a predetermined channel. Second, power is applied to the control device. Subsequently, the control device listens for the beacon message for a predetermined amount of time on each of the plurality of channels, and receives the beacon message on the predetermined channel. Next, the a first signal uniquely identifying the control device is transmitted wirelessly from the control device on the predetermined channel within a predetermined amount of time power is applied to the control device. Finally, the control device receives a second signal transmitted on the predetermined channel, and programs the memory with the default factory setting in response to the second signal.

11 Claims, 5 Drawing Sheets

U.S. PATENT DOCUMENTS

| | | | |
|---|---|---|---|
| 5,467,266 A | 11/1995 | Jacobs et al. | |
| 5,671,387 A | 9/1997 | Jacobs et al. | |
| 5,736,965 A | 4/1998 | Mosebrook et al. | |
| 5,818,128 A | 10/1998 | Hoffman et al. | |
| 5,838,226 A | 11/1998 | Houggy et al. | |
| 5,848,054 A | 12/1998 | Mosebrook et al. | |
| 5,905,442 A | 5/1999 | Mosebrook et al. | |
| 5,982,103 A | 11/1999 | Mosebrook et al. | |
| 6,175,201 B1 | 1/2001 | Sid | |
| 6,275,476 B1 | 8/2001 | Wood, Jr. | |
| 6,324,089 B1 | 11/2001 | Symoen et al. | |
| 6,388,399 B1 | 5/2002 | Eckel et al. | |
| 6,535,109 B1 | 3/2003 | Mahdavi | |
| 6,661,336 B1 | 12/2003 | Atkins et al. | |
| 6,687,487 B1 | 2/2004 | Mosebrook et al. | |
| 6,803,728 B2 | 10/2004 | Balasubramaniam et al. | |
| 6,812,843 B2 | 11/2004 | Soto et al. | |
| 6,819,223 B2 | 11/2004 | Amtmann | |
| 6,831,562 B2 | 12/2004 | Rodgers et al. | |
| 6,831,569 B2 | 12/2004 | Wang et al. | |
| 6,856,236 B2 | 2/2005 | Christensen et al. | |
| 6,876,294 B1 | 4/2005 | Regan | |
| 6,879,806 B2 | 4/2005 | Shorty | |
| 6,901,439 B1 * | 5/2005 | Bonasia et al. | 709/220 |
| 6,901,542 B2 | 5/2005 | Bartenstein et al. | |
| 6,927,547 B2 | 8/2005 | Walko, Jr. et al. | |
| 6,975,206 B2 | 12/2005 | Reining | |
| 6,980,080 B2 | 12/2005 | Christensen et al. | |
| 6,983,783 B2 | 1/2006 | Carmen, Jr. et al. | |
| 7,031,735 B2 | 4/2006 | Koshino | |
| 7,054,616 B2 | 5/2006 | Rickhoff et al. | |
| 7,085,627 B2 | 8/2006 | Bamberger et al. | |
| 7,102,502 B2 | 9/2006 | Autret | |
| 7,106,261 B2 | 9/2006 | Nagel | |
| 7,123,140 B1 | 10/2006 | Denes | |
| 7,126,291 B2 | 10/2006 | Kruse et al. | |
| 7,130,584 B2 | 10/2006 | Hirvonen | |
| 7,155,296 B2 | 12/2006 | Klasson et al. | |
| 7,193,504 B2 | 3/2007 | Carrender et al. | |
| 7,211,968 B2 | 5/2007 | Adamson et al. | |
| 7,219,141 B2 | 5/2007 | Bonasia et al. | |
| 7,253,717 B2 * | 8/2007 | Armstrong et al. | 340/10.2 |
| 7,307,542 B1 | 12/2007 | Chandler et al. | |
| 7,346,016 B2 | 3/2008 | Nielsen et al. | |
| 7,486,172 B2 | 2/2009 | Martinez et al. | |
| 7,498,924 B2 | 3/2009 | Scherabon | |
| 2002/0043938 A1 | 4/2002 | Lys | |
| 2002/0046226 A1 * | 4/2002 | Nakabe et al. | 708/250 |
| 2002/0049822 A1 | 4/2002 | Burkhardt et al. | |
| 2002/0126020 A1 | 9/2002 | Wang et al. | |
| 2002/0140379 A1 * | 10/2002 | Chevalier et al. | 315/291 |
| 2002/0154025 A1 | 10/2002 | Ling | |
| 2003/0040813 A1 | 2/2003 | Gonzales et al. | |
| 2003/0109270 A1 | 6/2003 | Shorty | |
| 2004/0051467 A1 | 3/2004 | Balasubramaniam et al. | |
| 2004/0158624 A1 | 8/2004 | Bodin et al. | |
| 2004/0250964 A1 | 12/2004 | Carmen et al. | |
| 2005/0102040 A1 | 5/2005 | Kruse et al. | |
| 2005/0280598 A1 | 12/2005 | Webb et al. | |
| 2006/0002110 A1 | 1/2006 | Dowling et al. | |
| 2006/0071757 A1 | 4/2006 | Burghard et al. | |
| 2006/0125426 A1 | 6/2006 | Veskovic | |
| 2006/0171332 A1 | 8/2006 | Barnum | |
| 2006/0174102 A1 | 8/2006 | Smith et al. | |
| 2006/0099422 A1 | 9/2006 | Cash | |
| 2006/0273970 A1 | 12/2006 | Mosebrook et al. | |
| 2006/0284734 A1 | 12/2006 | Newman, Jr. | |
| 2007/0076650 A1 * | 4/2007 | Manjeshwar et al. | 370/328 |
| 2007/0126555 A1 | 6/2007 | Bandy | |
| 2007/0139164 A1 | 6/2007 | O'Toole et al. | |
| 2007/0159305 A1 | 7/2007 | Cesar et al. | |
| 2007/0200677 A1 | 8/2007 | Murano | |
| 2008/0055073 A1 | 3/2008 | Raneri | |
| 2008/0068126 A1 | 3/2008 | Johnson | |
| 2008/0089266 A1 | 4/2008 | Orsat | |
| 2008/0092075 A1 | 4/2008 | Jacob et al. | |
| 2008/0111491 A1 | 5/2008 | Spira | |
| 2008/0125057 A1 | 5/2008 | Nass et al. | |
| 2008/0136663 A1 | 6/2008 | Courtney | |
| 2009/0201135 A1 | 8/2009 | Kawamura et al. | |

FOREIGN PATENT DOCUMENTS

| | | |
|---|---|---|
| EP | 1 513 376 | 3/2005 |
| EP | 1 693 991 A1 | 8/2006 |
| GB | 2410867 | 8/2005 |
| JP | 03-244954 | 10/1991 |
| JP | 2003 087403 | 3/2003 |
| WO | WO 97/29467 | 8/1997 |
| WO | WO 01/52515 A | 7/2001 |
| WO | WO 02/071689 | 9/2002 |
| WO | WO 03/007665 | 1/2003 |
| WO | WO 2006/046104 | 5/2006 |

OTHER PUBLICATIONS

Zensys A/S, Z-Wave Protocol Overview, Document No. SDS10243, Version 2, Apr. 24, 2006, 20 pages.

Eriksson, H.et al., "Performance of dynamic channel allocation in the DECT system," May 19, 1991, 1991 IEEE 41th Vehicular Technology Conference, St. Louis, May 19-22, 1991, IEEE Vehicular Technology Conference, New York, IEEE, US, pp. 693-698.

* cited by examiner

METHOD OF RESTORING A REMOTE WIRELESS CONTROL DEVICE TO A KNOWN STATE

BACKGROUND OF THE INVENTION

1. Field of the Invention

The present invention relates to load control systems for controlling electrical loads and more particularly to a procedure for restoring a remotely-located control device of a radio frequency (RF) lighting control system to a known state.

2. Description of the Related Art

Control systems for controlling electrical loads, such as lights, motorized window treatments, and fans, are known. Such control systems often use radio frequency (RF) transmission to provide wireless communication between the control devices of the system. Examples of RF lighting control systems are disclosed in commonly-assigned U.S. Pat. No. 5,905,442, issued on May 18, 1999, entitled METHOD AND APPARATUS FOR CONTROLLING AND DETERMINING THE STATUS OF ELECTRICAL DEVICES FROM REMOTE LOCATIONS, and commonly-assigned U.S. Pat. No. 6,803,728, issued Oct. 12, 2004, entitled SYSTEM FOR CONTROL OF DEVICES. The entire disclosures of both patents are hereby incorporated by reference.

The RF lighting control system of the '442 patent includes wall-mounted load control devices, table-top and wall-mounted master controls, and signal repeaters. The control devices of the RF lighting control system include RF antennas adapted to transmit and receive the RF signals that provide for communication between the control devices of the lighting control system. The control devices all transmit and receive the RF signals on the same frequency. Each of the load control devices includes a user interface and an integral dimmer circuit for controlling the intensity of an attached lighting load. The user interface has a pushbutton actuator for providing on/off control of the attached lighting load and a raise/lower actuator for adjusting the intensity of the attached lighting load. The table-top and wall-mounted master controls have a plurality of buttons and are operable to transmit RF signals to the load control devices to control the intensities of the lighting loads.

Often, it is desirable to return one of the control devices of the lighting control system to a default factory setting, i.e., an "out-of-box" setting. Specifically, the selected control device may be programmed to communicate on a second channel that is different than the selected channel that the other devices of the lighting control system are using. Since the second channel is unknown to the control devices of the lighting control system, the selected control device is returned to the "out-of-box" setting before being assigned to communicate with the selected channel.

Prior art control devices have provided an "out-of-box" procedure for resetting the control device to the default factory setting, for example, in response to a predetermined sequential actuation of one or more of the buttons of the control devices. The "out-of-box" procedure requires that the control device be located in a reasonably accessible fashion to provide for physical contact between a user and an actuator of the control device to identify each control device that needs to be returned to the factory settings.

However, load control devices, such as electronic dimming ballasts, motorized window treatments, or remote dimmer modules, may be mounted in remote locations such that physical contact with the load control device during the "out-of-box" procedure is rendered impractical. Further, since the control device is communicating on a channel may be unknown to the other control devices, the control devices may not be able to communicate with the control device. Therefore, there is a need for a method of returning a remotely-located control device to a default factory setting. Specifically, there is a need for a method of establishing communication with a remotely mounted control device that may be communicating on an unknown channel in order to return a remotely-located control device to a default factory setting.

SUMMARY OF THE INVENTION

According to the present invention, a method of restoring a remotely-located control device of a control system to a default factory setting is provided. The control device is operable to be coupled to a source of power and has a memory for storing programming information. The method comprises the steps of: (1) transmitting a beacon signal on a predetermined channel; (2) applying power to the control device; (3) the control device subsequently listening for the beacon signal for a predetermined amount of time on each of the plurality of channels; (4) the control device receiving the beacon signal on the predetermined channel; (5) the control device transmitting on the predetermined channel a first signal uniquely identifying the control device within a predetermined amount of time after the step of applying power to the control device; (6) the control device receiving a second signal transmitted on the predetermined channel; and (7) the control device programming the memory with the default factory setting in response to the second signal.

The present invention further provides a method for restoring at least one radio frequency controlled control device of a plurality of control devices from a first state to a second state. The plurality of control device are operable to be controlled by radio frequency signals transmitted on one of a plurality of radio frequency channels by a first transmitter device. The method comprises the steps of initiating at the first transmitter device a mode to configure the at least one control device into the second state, transmitting a beacon message on one of the channels from a beacon message transmitting device, and monitoring by the at least one control device for the beacon message that is transmitted on one of a plurality of radio frequency channels. The control device begins to scan on each of the plurality of radio frequency channels each for a period of time for the beacon message, and locks on to the one of the plurality of channels on which the beacon message is received and then halts further scanning. The method further comprises the steps of transmitting by the first transmitter device an instruction message to the control device that instructs the control device to receive the messages transmitted on the designated radio frequency channel, determining at the first transmitter device the presence of the at least one control device, enabling a user to select at the first device the at least one control device for restoration to the second state, and transmitting a message on the designated radio frequency channel from the first device to be received by the selected control device to restore the selected control device to the second state.

Other features and advantages of the present invention will become apparent from the following description of the invention that refers to the accompanying drawings.

DETAILED DESCRIPTION OF THE INVENTION

Figure 1:
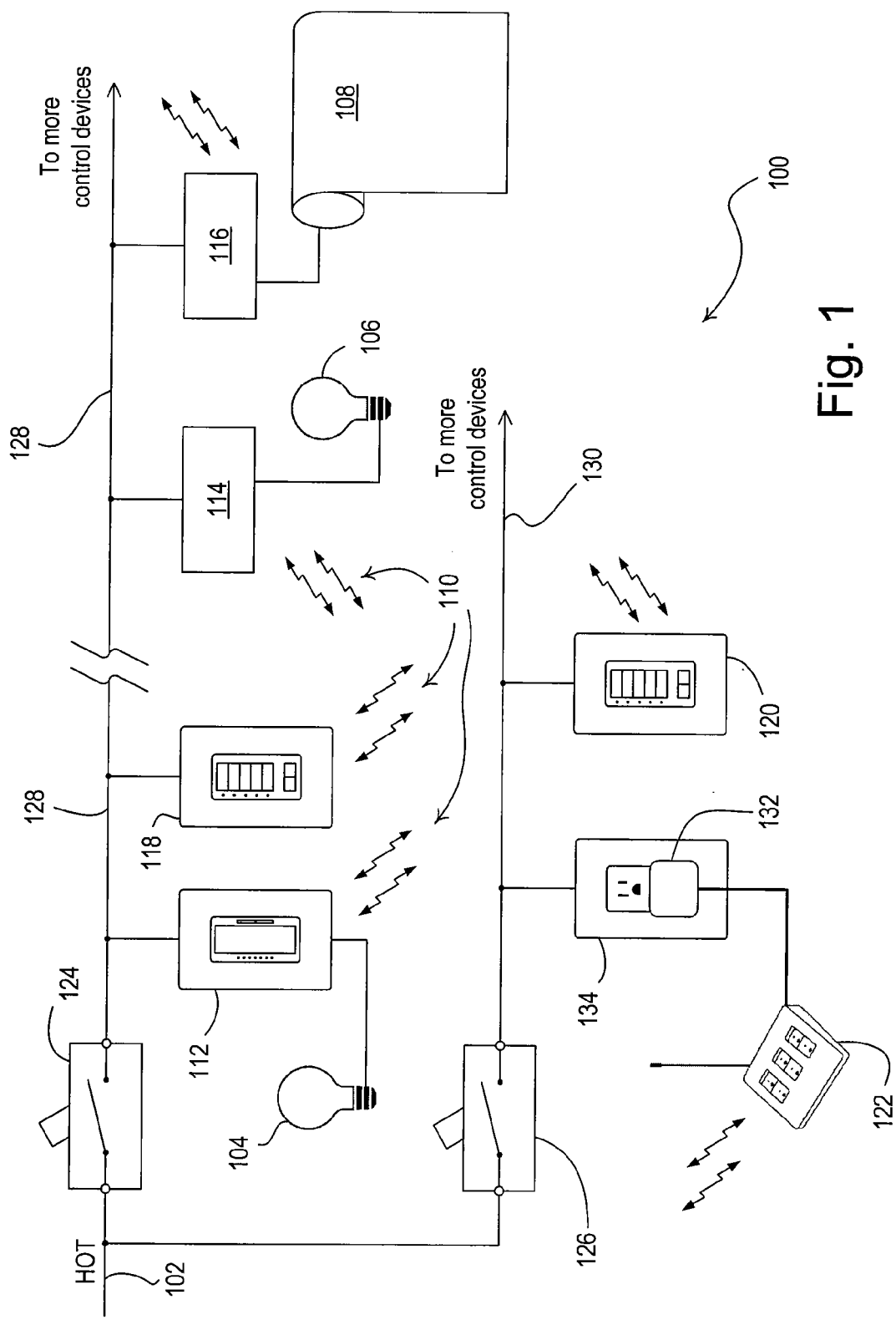
FIG. 1 is a simplified block diagram of an RF lighting control system according to the present invention.

The foregoing summary, as well as the following detailed description of the preferred embodiments, is better understood when read in conjunction with the appended drawings. For the purposes of illustrating the invention, there is shown in the drawings an embodiment that is presently preferred, in which like numerals represent similar parts throughout the several views of the drawings, it being understood, however, that the invention is not limited to the specific methods and instrumentalities disclosed.

FIG. 1 is a simplified block diagram of an RF lighting control system 100 according to the present invention. The RF lighting control system 100 is operable to control the power delivered from a source of AC power to a plurality of electrical loads, for example, lighting loads 104, 106 and a motorized roller shade 108. The RF lighting control system 100 includes a HOT connection 102 to a source of AC power for powering the control devices and the electrical loads of the lighting control system. The RF lighting control system 100 utilizes an RF communication link for communication of RF signals 110 between control devices of the system.

The lighting control system 100 comprises a wall-mounted dimmer 112 and a remote dimming module 114, which are operable to control the intensities of the lighting loads 104, 106, respectively. The remote dimming module 114 is preferably located in a ceiling area, i.e., near a lighting fixture, or in another remote location that is inaccessible to a typical user of the lighting control system 100. A motorized window treatment (MWT) control module 116 is coupled to the motorized roller shade 108 for controlling the position of the fabric of the roller shade and the amount of daylight entering the room. Preferably, the MWT control module 116 is located inside the roller tube of the motorized roller shade 108, and is thus inaccessible to the user of the system.

A first wall-mounted master control 118 and a second wall-mounted master control 120 each comprise a plurality of buttons that allow a user to control the intensity of the lighting loads 104, 106 and the position of the motorized roller shade 108. In response to an actuation of one of the buttons, the first and second wall-mounted master controls 118, 120 transmit RF signals 110 to the wall-mounted dimmer 112, the remote dimming module 114, and the MWT control module 116 to control the associated loads.

Preferably, the control devices of the lighting control system 100 are operable to transmit and receive the RF signals 110 on a plurality of channels (i.e., frequencies). A repeater 122 is operable to determine a select one of the plurality of channels for all of the control devices to utilize. For example, 60 channels, each 100 kHz wide, are available in the United States. The repeater 122 also receives and re-transmits the RF signals 110 to ensure that all of the control devices of the lighting control system 100 receive the RF signals. Each of the control devices in the RF lighting control system comprises a serial number that is preferably six bytes in length and is programmed in a memory during production. As in the prior art control systems, the serial number is used to uniquely identify each control device during initial addressing procedures.

The lighting control system 100 further comprises a first circuit breaker 124 coupled between the HOT connection 102 and a first power wiring 128, and a second circuit breaker 126 coupled between the HOT connection 102 and a second power wiring 130. The wall-mounted dimmer 112, the first wall-mounted master control 118, the remote dimming module 114, and the MWT control module 116 are coupled to the first power wiring 128. The repeater 122 and the second wall-mounted master control 120 are coupled to the second power wiring 130. The repeater 122 is coupled to the second power wiring 130 via a power supply 132 plugged into a wall-mounted electrical outlet 134. The first and second circuit breakers 124, 126 allow power to be disconnected from the control devices and the electrical loads of the RF lighting control system 100.

The first and second circuit breakers 124, 126 preferably include manual switches that allow the circuit breakers to be reset to the closed position from the open position. The manual switches of the first and second circuit breakers 124, 126 also allow the circuit breakers to be selectively switched to the open position from the closed position. The construction and operation of circuit breakers is well known and, therefore, no further discussion is necessary.

Figure 2:
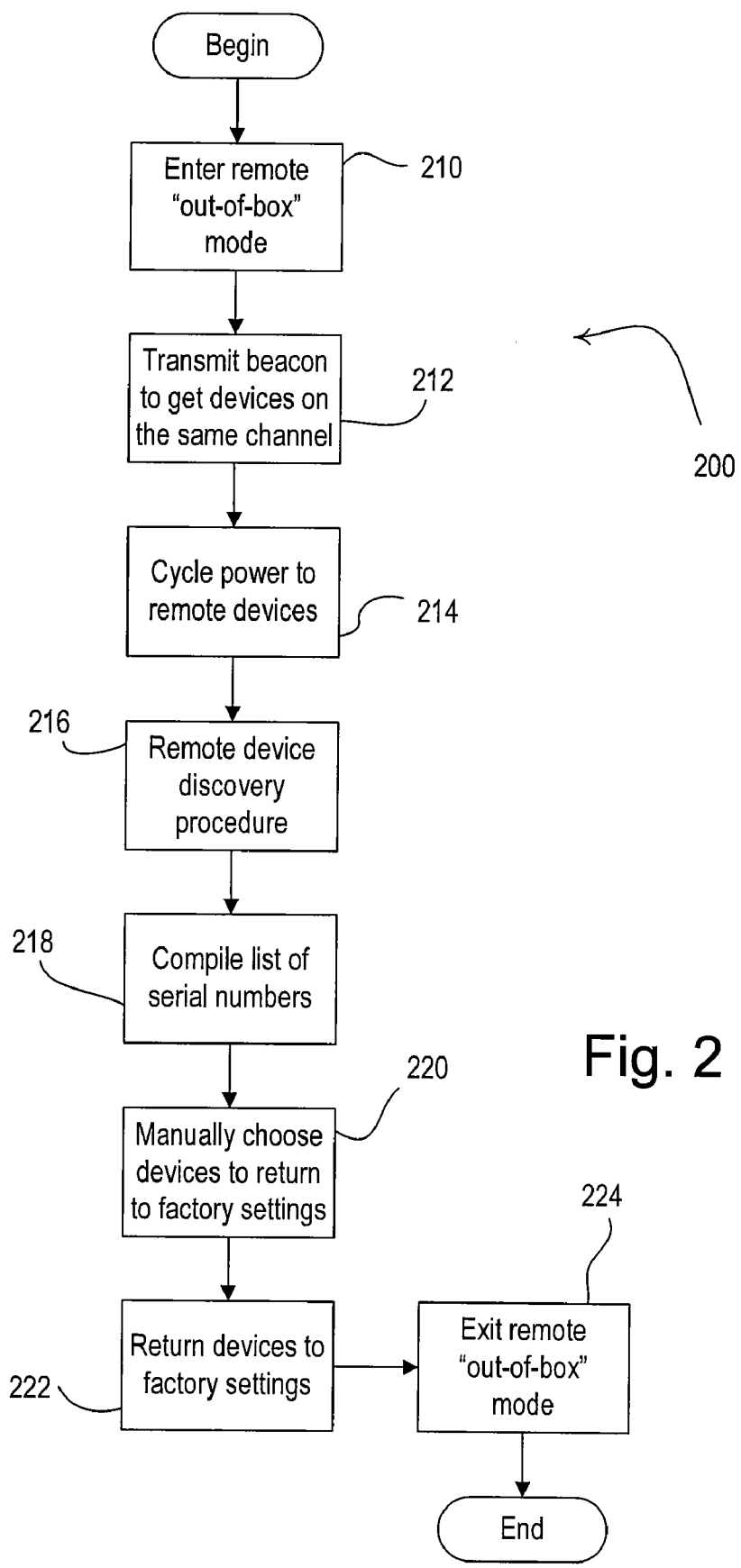
FIG. 2 is a flowchart of a remote "out-of-box" procedure for the RF lighting control system of FIG. 1 according to the present invention.

FIG. 2 is a flowchart of a remote "out-of-box" procedure 200 for a remotely-located control device of the lighting control system 100 according to the present invention. The remote "out-of-box" procedure 200 is operable to return the remotely-located control devices, i.e., the remote dimming module 114 or the MWT control module 116, to the default factory setting, i.e., the "out-of-box" setting. Each of the remote devices includes a number of flags that are utilized during the "out-of-box" procedure 200. The first flag is a POWER_CYCLED flag that is set when power has recently been cycled to the remote device. As used herein, "power cycling" is defined as removing power from a control device and then restoring power to the control device to cause the control device to restart or reboot. The second flag is a FOUND flag that is set when the remote device has been "found" by a remote device discovery procedure 216 to be described in greater detail below with reference to FIG. 4.

Prior to the start of the "out-of-box" procedure 200, the repeater 122 preferably selects an optimum one of the available channels on which to communicate. To find an optimum channel, the repeater 122 selects at random one of the available radio channels, listens to the selected channel, and decides whether the ambient noise on that channel is unacceptably high. If the received signal strength is greater than a noise threshold, the repeater 122 rejects the channel as unusable, and selects a different channel. Eventually, the repeater 122 determines the optimum channel for use during normal operation. The procedure to determine the optimum channel is described in greater detail in the '728 patent.

Figure 3A:
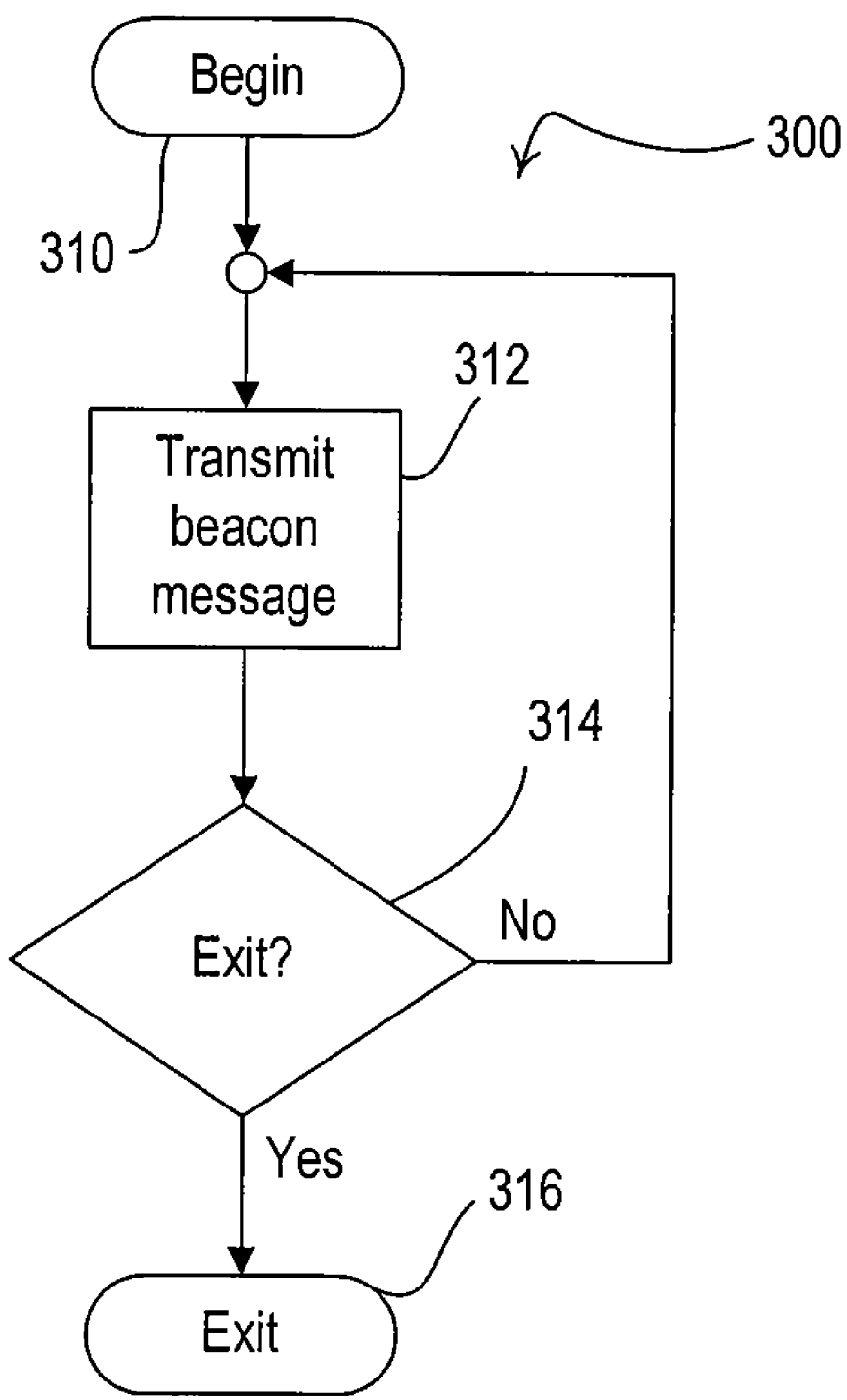
FIG. 3A is a flowchart of a first beacon process executed by a repeater of the lighting control system of FIG. 1 during the remote "out-of-box" procedure of FIG. 2.

Referring to FIG. 2, the remote "out-of-box" procedure 200 begins when the lighting control system 100 enters an "out-of-box" mode at step 210, for example, in response to a user pressing and holding an actuator on the repeater 122 for a predetermined amount of time. Next, the repeater 122 begins repeatedly transmitting a beacon message to the control devices on the selected channel at step 212. Each of the control devices sequentially changes to each of the available channels to listen for the beacon message. Upon receiving the beacon message, the control devices begins to communicate on the selected channel. FIG. 3A is a flowchart of a first beacon process 300 executed by the repeater 122 during step 212.

Referring to FIG. 3A, the first beacon process 300 begins at step 310. The repeater 122 transmits the beacon message at step 312. Specifically, the beacon message includes a command to "stay on my frequency", i.e., to begin transmitting and receiving RF signals on the selected channel. Alternatively, the beacon message could comprise another type of control signal, for example, a continuous-wave (CW) signal, i.e., to "jam" the selected channel. At step 314, if the user has not instructed the repeater 122 to exit the beacon process 300, e.g., by pressing and holding an actuator on the repeater for a predetermined amount of time, then the process continues to transmit the beacon message at step 312. Otherwise, the beacon process exits at step 316.

Referring back to FIG. 2, the user cycles power to the specific control device that is to be returned to the "out-of-box" settings, for example, the remote dimming module 114, at step 214. The user switches the first circuit breaker 124 to the open position in order to disconnect the source from the first power wiring 128, and then immediately switches the first circuit breaker back to the closed position to restore power. The step of power cycling prevents the user from inadvertently resetting a control device in a neighboring RF lighting control system to the "out-of-box" setting. Upon power-up, the remote control devices coupled to the first power wiring 128 set the POWER_CYCLED flag in memory to designate that power has recently been applied. Further, the remote devices begin to decrement a "power-cycled" timer. Preferably, the "power-cycled" timer is set to expire after approximately 10 minutes, after which the remote devices clear the POWER_CYCLED flag.

Figure 3B:
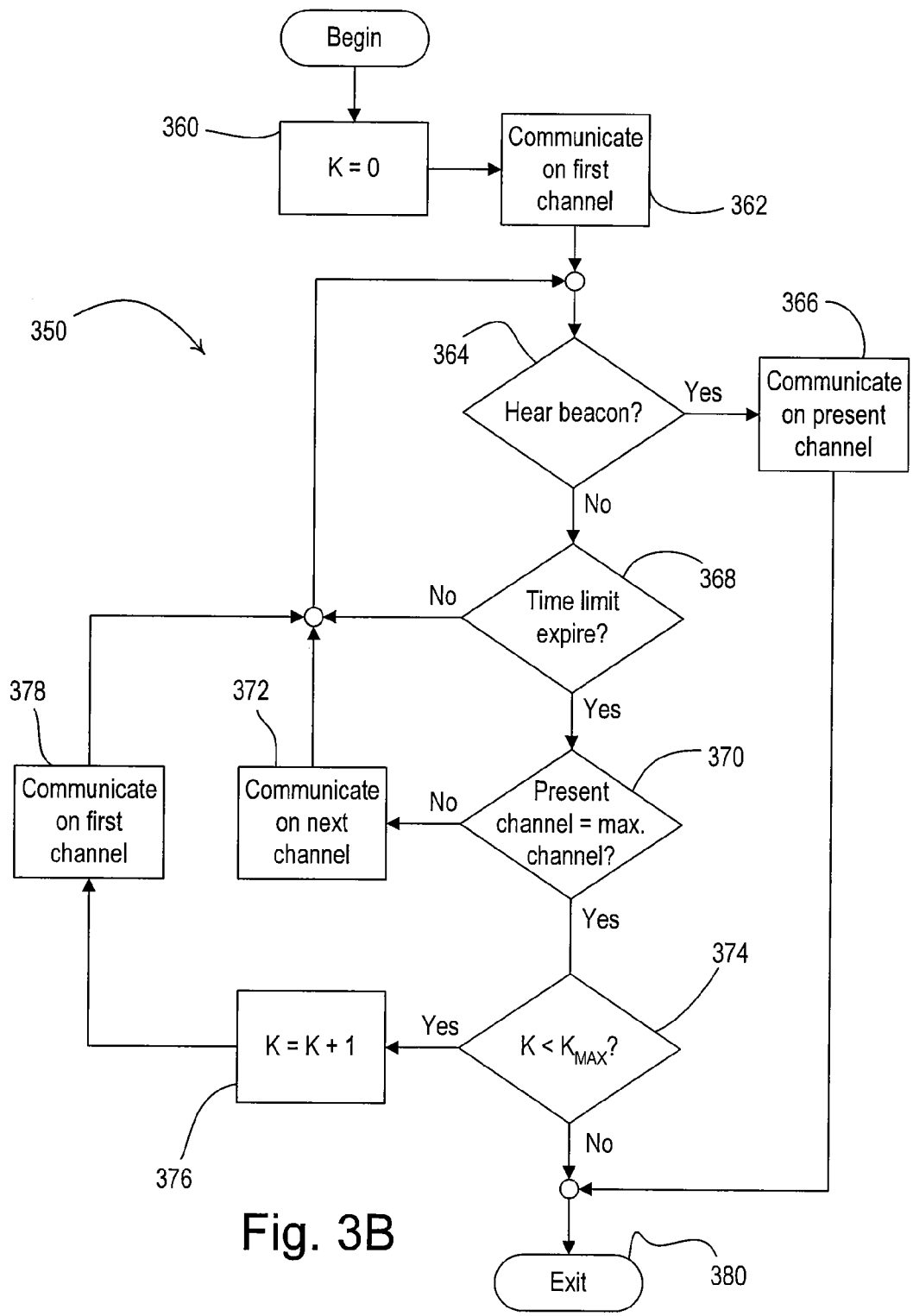
FIG. 3B is a flowchart of a second beacon process executed by a control device of the lighting control system of FIG. 1 at power up.

Next, the control devices coupled to the first power wiring 128 execute a second beacon procedure 350. FIG. 3B is a flowchart of a second beacon process 350 executed by each of the control devices at power up, i.e., when power is first applied to the control device. The second beacon process 350 executes for a predetermined number of times dependent upon a constant $K_{MAX}$. To achieve this control, a variable K is used to count the number of times the control device cycles through each of the available channels listening for the beacon message. Specifically, the variable K is initialized to zero at step 360. At step 362, the control device begins to communicate on the first channel (i.e., to listen for the beacon message on the lowest available channel) and a timer is initialized to a constant $T_{MAX}$ and starts decreasing. If the control device hears the beacon at step 364, the control device maintains the present channel as the communication channel at step 366 and exits the process at step 380.

Preferably, the control device listens for a predetermined amount of time (i.e., corresponding to the constant $T_{MAX}$ of the timer) on each of the available channels and steps through consecutive higher channels until the control device receives the beacon message. Preferably, the predetermined amount of time is substantially equal to the time required to transmit the beacon message twice plus an additional amount of time. For example, if the time required to transmit the beacon message once is approximately 140 msec and the additional amount of time is 20 msec, the predetermined amount of time that the control device listens on each channel is preferably 300 msec.

Specifically, if the control device does not hear the beacon message at step 364, a determination is made as to whether the timer has expired at step 368. If the timer has not expired, the process loops until the timer has expired. At step 370, if the present channel is not equal to the maximum channel, i.e., the highest available channel, the control device begins to communicate on the next higher available channel and the timer is reset at step 372. Then, the control device listens for the beacon message once again at step 364. If the present channel is equal to the maximum channel at step 370, the process moves to step 374. At step 374, if the variable K is less than the constant $K_{MAX}$, the variable K is incremented and the control device begins to communicate again on the first channel and the timer is reset at step 376. Accordingly, the control device listens for the beacon message on each of the available channels once again. However, if the variable K is not less than the constant $K_{MAX}$ at step 374, the second beacon process 350 exits at step 380. Preferably, the value of $K_{MAX}$ is two (2), such that the control device listens for the beacon message on each of the available channels twice.

In summary, after power is cycled to the desired control device at step 214 (by switching the first circuit breaker 124, the control devices coupled to the first power wiring 128 execute the second beacon process 350. Thus, these control devices are operable to communicate on the selected channel.

Figure 4:
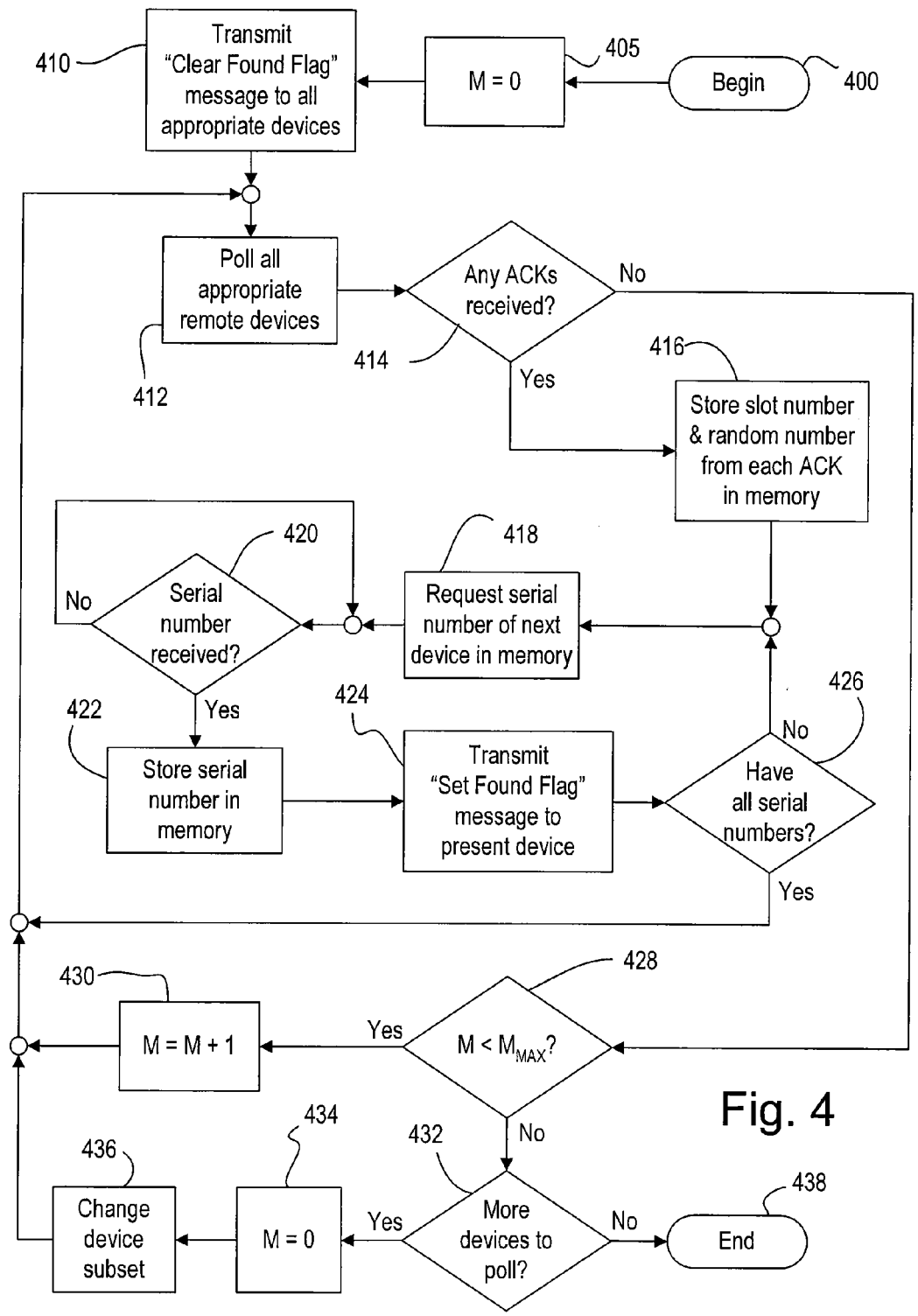
FIG. 4 is a flowchart of a remote device discovery procedure executed by the repeater of the RF lighting control system during the addressing procedure of FIG. 2.

After the power is cycled at step 214, the remote device discovery procedure 216, which is shown in FIG. 4, is executed by the repeater 122. The remote device discovery procedure is performed on all "appropriate" control devices, i.e., those devices have not been found by the remote device discovery procedure (i.e., the FOUND flag is not set) and have recently had power cycled (i.e., the POWER_CYCLED flag is set). Accordingly, the remote device discovery procedure 216 must be completed before the "power-cycled" timer in each applicable control device expires.

Referring to FIG. 4, the remote device discovery procedure 216 begins at step 400. A variable M, which is used to determine the number of times that one of the control loops of the remote device discovery procedure 216 repeats, is set to zero at step 405. At step 410, the repeater 122 transmits a "clear found flag" message to all appropriate devices. When a control device that has the POWER_CYCLED flag set receives the "clear found flag" message, the control device reacts to the message by clearing the FOUND flag. At step 412, the repeater 122 polls, i.e., transmits a query message to, a subset of the appropriate remote devices. The subset may be, for example, half of the appropriate remote devices, such as those control devices that have not been found, have been recently power cycled, and have even serial numbers. The query message contains a request for the receiving control device to transmit an acknowledgement (ACK) message containing a random data byte in a random one of a predetermined number of ACK transmission slots, e.g., preferably, 64 ACK transmission slots. The appropriate remote devices respond by transmitting the ACK message, which includes a random data byte, to the repeater 122 in a random ACK transmission slot. At step 414, if at least one ACK message is received, the repeater 122 stores the number of the ACK transmission slot and the random data byte from each ACK message in memory at step 416.

Next, the repeater 122 transmits a "request serial number" message to each device that was stored in memory (i.e., each device having a random slot number and a random data byte stored in memory at step 416). Specifically, at step 418, the repeater transmits the message to the "next" device, e.g., the first device in memory when the "request serial number" message is transmitted for the first time. Since the repeater 122 has stored only the number of the ACK transmission slot and the associated random data byte for each device that transmitted an ACK message, the "request serial number" message is transmitted using this information. For example, the repeater 122 may transmit a "request serial number" message to the device that transmitted the ACK message in slot number 34 with the random data byte 0xA2 (hexadecimal). The repeater 122 waits to receive a serial number back from the device at step 420. When the repeater 122 receives the serial number, the serial number is stored in memory at step 422. At step 424, the repeater transmits a "set found flag" message to the present control device, i.e., to the control device having the serial number that was received at step 420. Upon receipt of the "set found flag" message, the remote device sets the FOUND flag in memory, such that the device no longer responds to query messages during the remote device discovery procedure 216. At step 426, if all serial numbers have not been collected, the process loops around to request the serial number of the next control device at step 418.

Since collisions might have occurred when the remote devices were transmitting the ACK message (at step 414), the same subset of devices is polled again at step 412. Specifically, if all serial numbers have been collected at step 426, the process loops around to poll the same subset of devices again at step 412. If no ACK messages are received at step 414, the process flows to step 428. If the variable M is less than a constant $M_{MAX}$ at step 428, the variable M is incremented at step 430. To ensure that all of the devices in the first subset have transmitted an ACK message to the query at step 412 without a collision occurring, the constant $M_{MAX}$ is preferably two (2) such that the repeater 122 preferably receives no ACK messages at step 414 in response to transmitting two queries at step 412. If the variable M is not less than the constant $M_{MAX}$ at step 428, then a determination is made at step 432 as to whether there are more devices to poll. If so, the variable M is set to zero at step 434 and the subset of devices (that are polled in step 412) is changed at step 436. For example, if the devices having even serial numbers were previously polled, the subset is changed to those devices having odd serial numbers. If there are no devices left to poll at step 432, the remote device discovery procedure exits at step 438.

Referring back to FIG. 2, at step 218, the repeater 122 compiles a list of serial numbers of all remote devices found in the remote device discovery procedure 216. At step 220, the user may manually choose which of the control devices in the list are to be reset to the default factory settings. For example, the user may use a graphical user interface (GUI) software provided on a personal computer (PC) that is operable to communicate with the RF lighting control system 100. Accordingly, the user may step through each control device in the list of serial numbers and individually decide which devices to restore to the "out-of-box" setting. Finally, the selected control devices are restored to the "out-of-box" setting at step 222 and the user causes the lighting control system 100 to exit the remote "out-of-box" mode at step 224, e.g., by pressing and holding an actuator on the repeater 122 for a predetermined amount of time.

While the present invention has been described with reference to an RF lighting control system, the procedures of the present invention could be applied to other types of lighting control system, e.g., a wired lighting control system, in order to restore a remotely-located control device on a wired communication link to a default setting.

Although the present invention has been described in relation to particular embodiments thereof, many other variations and modifications and other uses will be apparent to those skilled in the art. It is preferred, therefore, that the present invention be limited not by the specific disclosure herein, but only by the appended claims.

What is claimed is:

1. A method for restoring a first radio frequency (RF) control device of a plurality of control devices from a first state to a second state, the plurality of control devices operable to be controlled by radio frequency signals transmitted on one of a plurality of radio frequency channels by a first transmitter device, the first RF control device adapted to be coupled to a source of power, a switch coupled in series between the source of power and the control device, the method comprising the steps of:

initiating at the first transmitter device an out-of-box mode to configure the first RF control device into the second state;

transmitting a beacon message on one of the channels from the first transmitting device in response to the step of initiating at the first transmitter device the out-of-box mode to configure the first RF control device into the second state;

subsequently operating the switch to cycle power to the first RF control device from off to on to identify the first RF control device as requiring an address;

monitoring by the first RF control device for the beacon message that is transmitted on one of a plurality of radio frequency channels, wherein the first RF control device begins to scan on each of the plurality of radio frequency channels each for a period of time for the beacon message, and wherein the first RF control device locks on to the one of the plurality of channels on which the beacon message is received and then halts further scanning;

transmitting by the first transmitter device an instruction message to the first RF control device that instructs the first RF control device to receive the messages transmitted on a designated radio frequency channel;

determining at the first transmitter device the presence of the first RF control device;

enabling a user to select at the first transmitter device the first RF control device for restoration to the second state; and transmitting a message on the designated radio frequency channel from the first transmitter device, while the first transmitter device is in the out-of-box mode, to be received by the first RF control device to restore the first RF control device to the second state.

2. The method of claim 1, wherein the second state is a default state whereby the control device is configured with factory default settings.

3. The method of claim 1, wherein the step of determining comprises:

determining at least one unique identifier for the first RF control device; and compiling a list at the first transmitter device including the at least one unique identifier.

4. The method of claim 3, wherein the step of determining further comprises:

transmitting from the first transmitter device to the plurality of control devices a clear signal to clear a second flag in a memory of each control device;

responding by each control device to the clear signal only if a first flag in memory of the control device has been set corresponding to a requirement to obtain an address;

transmitting a polling signal to the control devices from the first transmitter device;

providing by the control devices an acknowledgment signal to the first transmitter device that the second flag is cleared;

storing information related to the acknowledgment signal in a memory of the first transmitter device;

transmitting from the first transmitter device a further signal to each control device from which an acknowledgment signal was received by the first transmitter device to obtain the unique identifier of the control device;

transmitting by the control device the unique identifier to the first transmitter device; and transmitting by the first transmitter device a signal to the remote control device whose unique identifier has been received at the first transmitter device to set the second flag in the memory of the remote control device.

5. The method of claim 4, further comprising manually activating a control on the first RF control device to set the first flag and identify that the first RF control device requires an address.

6. The method of claim 4, wherein the first flag is set by operating the switch to cycle power to the first RF control device from off to on to identify the first RF control device as requiring an address.

7. The method of claim 4, wherein the first flag is set by a user providing a unique identifier of the first RF control device to identify the first RF control device as requiring an address.

8. The method of claim 3, wherein the unique identifier comprises a manufacturer serial number of the control device.

9. A method of restoring a remotely-located control device of a control system to a default factory setting, the control device operable to be coupled to a source of power, a switch coupled in series between the source of power and the control device, and having a memory for storing programming information, the method comprising the steps of:

transmitting a beacon signal on a predetermined channel;

subsequently operating the switch to cycle power from off to on to the control device in response to the step of transmitting a beacon signal on the predetermined channel;

the control device subsequently listening for the beacon signal for a predetermined amount of time on each of a plurality of channels in response to the step of subsequently operating the switch to cycle power from off to on to the control device;

the control device receiving the beacon signal on the predetermined channel within the predetermined amount of time;

the control device transmitting on the predetermined channel a first signal uniquely identifying the control device within the predetermined amount of time after the step of operating the switch to cycle power from off to on to the control device;

the control device receiving a second signal transmitted on the predetermined channel in response to transmitting on the predetermined channel the first signal uniquely identifying the control device; and the control device programming the memory with the default factory setting in response to the second signal.

10. The method of claim 9, wherein the step of transmitting a beacon signal comprises transmitting a beacon message repeatedly on the predetermined channel.

11. The method of claim 9, wherein the control system comprises a wireless control system.

\* \* \* \* \*